Patented July 1, 1952

2,602,076

UNITED STATES PATENT OFFICE 2,602,076

PRODUCTION OF OIL SOLUBLE PHENOLIC RESINS

Arthur S. Teot, Midland, Mich., assignor to The Dow Chemical Company, Midland, Mich., a corporation of Delaware No Drawing. Application August 1, 1949, Serial No. 108,040

5 Claims. (Cl. 260—51)

This invention relates to the production of oil-soluble phenolic resins, and to new oil-soluble phenolic resins.

It has been known that oil-soluble resins can be prepared by condensing aldehydes with purified aralkyl phenols. These latter materials can be produced by the condensation of styrene or styrene derivatives with phenol, as is described in U. S. Patents 2,247,402 and 2,247,403 issued July 1, 1941 to Perkins and Bryner. In order to produce oil-soluble phenolic resins by such known methods it has been necessary to condense pure aralkyl phenols with aldehydes; thus, aralkyl phenols produced by the method of U. S. Patents 2,247,402 and 2,247,403 must be purified before they can be used by known methods to produce oil-soluble phenolic resins. It has not been known that oil-soluble resins can be produced by reacting an aldehyde with the unseparated products of the reaction of a phenol with styrene or a substituted styrene. The present invention is based upon the discovery that it is possible to react styrene, or one of certain styrene derivatives, with a phenol and then to add an aldehyde to the unseparated reaction products, which include an aralkyl phenol, to produce an oil-soluble resin.

The principal object of the invention is to produce an oil-soluble phenolic resin. Another object of the invention is to provide novel oil-soluble phenolic resins.

In accordance with the invention about one mol of a 2-aryl-1-alkene is condensed with a mixture of 0.7 mol of phenol or a meta-substituted phenol and a strong mineral-acid catalyst, which mixture is at a temperature between about 20° C. and about 250° C. When the reaction between the 2-aryl-1-alkene and the phenol is completed, an aldehyde and a condensation catalyst are added to the unseparated reaction products and condensation polymerization of the resulting mixture to an oil-soluble phenolic resin is allowed to proceed.

The 2-aryl-1-alkene that is used in the practice of the invention has from eight to twelve carbon atoms. The aryl substituent is mononuclear, has from six to ten carbon atoms, and has not more than two substituents, each of which is an alkyl radical (i. e., the 2-aryl-1-alkene is one in which the alkene has from two to six carbon atoms and the aryl group is a phenyl or a mono- or di-alkyl substituted phenyl radical having not more than four carbon atoms in the alkyl substituents). The preferred 2-aryl-1-alkene is styrene, because of its cost advantage and availability. Other 2-aryl-1-alkenes include alpha methylstyrene, alpha-ethylstyrene, alpha-methyl-p-methylstyrene, o-methylstyrene, m-methylstyrene, p-methylstyrene, o-ethylstyrene, m-ethylstyrene and p-ethylstyrene. These 2-aryl-1-alkenes other than styrene are substituted styrenes; other substituted styrenes having not more than three alkyl substituents each in an alpha, ortho, meta or para position can be used, provided the total number of carbon atoms in such substituents does not exceed four.

The phenols that are used in the practice of the invention are mononuclear monohydric phenols containing a total of not more than ten carbon atoms, any substituent being an alkyl radical in a meta position. Such phenols have not more than two substituents containing a total of not more than four carbon atoms, and no carbon atom other than one in the meta position is substituted. Examples of such phenols include phenol, m-cresol, m-ethylphenol, m-xylenol and 3,5-diethylphenol. Unsubstituted phenol, because of its cost advantage, is the preferred phenol.

Formaldehyde for the condensation of the phenolstyrene addition product can be made available from formalin, an aqueous solution of formaldehyde which is the most abundant and economical form of formaldehyde, from paraformaldehyde, from hexamethylene tetramine, or from any of the other usual formaldehyde sources.

In general, the reaction between a phenol and an aldehyde is understood to involve the ortho and para positions in the phenol radical unless these positions are blocked by some substituent; therefore, when phenol itself is reacted with an aldehyde there are three reactive points, namely, the two ortho positions and the one para position, and insoluble cross-linked resins are formed. When the para position is blocked, e. g., when a styrenated phenol is used, there are only two reactive points, and straight chain polymers are believed to result. The chain compounds have the desired oil-solubility when the para substituent is styryl or a simple styryl derivative. Substitution of phenol in the two meta positions, in the absence of steric hinderance, does not interfere with resin formation. Accordingly, phenol and phenols that are alkyl substituted in the meta position are equivalents vis a vis the process of the instant invention.

The condensation or aralkylation reaction between a 2-aryl-1-alkene and a mononuclear monohydric phenol is believed to produce, principally, para-substituted phenols, although comparatively small amounts of a mono-ortho substituted product, as well as a small amount of a di-substituted product, and a trace of a tri-substituted product probably result. Such products are herein called "aralkyl phenols". The principal formaldehyde condensation reaction is, therefore, believed to proceed with a para-substituted phenol to produce a long-chain material; phenols having two of the three ortho and para positions blocked by substituents may well serve to end block such long chains.

The long chain resins that result when a mononuclear monohydric phenol and a 2-aryl-1-alkene are condensed according to the process of the invention and the crude products of the condensation reaction condensed with formaldehyde are oil-soluble.

Oil-soluble resins are useful in the varnish industry as additives, or bodying agents, for drying oils. In order to be effective as a drying oil additive a resin must be soluble in the oil and must have viscosity characteristics such that handling of the resin is feasible. A resin can be handled satisfactorily either if it is a solid that can be broken to a desired size range or if it is a liquid that can be poured. However, it is not feasible to produce liquid aralkyl phenol-formaldehyde resins as additives for drying oils. Such resins are liquid only if their average molecular weight is sufficiently low that desirable finish materials do not result when they are used as additives for drying oils. The average molecular weight of aralkyl phenol-formaldehyde resins produced from the crude reaction products of the aralkylation condensation is a direct function of the ratio of phenol to styrene used in conducting the aralkylation. Accordingly, low molecular weight (liquid) aralkyl phenol-formaldehyde resins are produced by utilizing a low ratio of phenol to 2-aryl-1-alkene in the aralkylation condensation. If the ratio of phenol to 2-aryl-1-alkene is increased the average molecular weight and the viscosity of the final aralkyl phenol-formaldehyde resin are likewise increased. However, before the ratio of phenol to 2-aryl-1-alkene is increased sufficiently that the final resin is useful for bodying drying oils, a material having a viscosity too high for economical handling on a commercial basis results. If the ratio of phenol to styrene is further increased, the final resin is insoluble in drying oils and in organic solvents such as toluene.

For example, if a styrenated phenol is produced by condensing about 0.65 mol of phenol per mol of styrene, the resin produced by condensing the crude product of the styrenation reaction with formaldehyde is a viscous mass that cannot economically be used as an additive for drying oils. If a styrenated phenol is produced by condensing about 0.75 mol of phenol per mol of styrene the resin produced by condensing the crude reaction products with formaldehyde is a solid material that is insoluble in drying oils. When, however, an aralkyl phenol is produced by causing condensation of about 0.7 mol of a mononuclear monohydric phenol with one mol of a 2-aryl-1-alkene, the resin that results by condensing the crude reaction product with formaldehyde is a solid that can be comminuted to a desired size range and dissolved in a drying oil to improve the characteristics thereof.

Both the aralkylation and the condensation reactions must be conducted in the presence of a catalyst. A strong mineral-acid such as hydrochloric, hydrobromic or phosphoric acid, may be used as the catalyst for the aralkylation reaction, the two first named being preferred. The amount of catalyst that is used is usually from about 0.02 per cent to about 2.5 per cent of the phenol and preferably about 0.05 to about 1 per cent. (The terms "parts" and "per cent" are used herein to mean parts and per cent by weight unless otherwise indicated.)

The condensation reaction between the crude aralkyl phenol and formaldehyde is also conducted in the presence of a catalyst. There may be used either an acid catalyst or a basic catalyst in an amount usual for the condensation of a substituted phenol with an aldehyde. When an acid catalyst is used it may be any of those indicated above as also operable in the aralkylation reaction. When a basic catalyst is used any of the ordinary basic catalysts for the condensation of phenol with an aldehyde may be used, e. g., NaOH, KOH, NH$_4$OH, and the like. When an acid catalyst is used for the condensation reaction it is usually desirable that the amount of the acid catalyst added be at least about equal to the amount of acid catalyst used for the aralkylation reaction but not more than about five times that amount. It is ordinarily preferable that the amount of acid be from about two to about four times the amount added for the aralkylation reaction. When a basic catalyst is used for the condensation reaction the acid catalyst present from the aralkylation reaction must first be neutralized, and then sufficient basic catalyst must be added for the reaction. Usually it is desirable that the total number of mols of basic catalyst, in addition to the amount added to neutralize the aralkylation catalyst, be at least equal to the total number of mols of acid catalyst added for the aralkylation reaction, but not more than about five times the number of mols of acid catalyst added. Ordinarily, it is preferable that the total number of mols of basic catalyst added, after the excess acid has been neutralized, be from two to about four times the total number of mols of acid catalyst added for the aralkylation reaction.

Aralkylation is advantageously conducted at a temperature between about 20° C. and about 250° C., preferably at a temperature between about 120° C. and about 150° C., the exact temperature employed depending upon the materials used. In condensing a 2-aryl-1-alkene with a phenol it is desirable to avoid high concentrations of 2-aryl-1-alkene in the course of the aralkylation reaction, because poly-aralkylation is likely when the concentration is high, and because 2-aryl-1-alkenes polymerize readily in the presence of strong mineral acids. Accordingly, it is usually desirable to add the 2-aryl-1-alkene to a mixture of the phenol or m-substituted phenol with the acid catalyst; the mixture is stirred during this addition to avoid high local concentrations of 2-aryl-1-alkene. The rate at which 2-aryl-1-alkene is added to the mixture depends upon the temperature of the mixture, but it is usually desirable that the 2-aryl-1-alkene be added in not less than about two hours, and preferable that it be added in not less than about two and one-half hours. Ordinarily there is no reason to add the 2-aryl-1-alkene in more than about five hours, and longer addition times are economically disadvantageous. It is usually preferable that the 2-aryl-1-alkene be added in not longer than about three hours. When the aldehyde used is added in the form of an aqueous solution (e. g. formalin) the condensation reaction is preferably conducted at a temperature lower than the boiling temperature of water. This is true because it is ordinarily economically advantageous not to conduct the reaction under super-atmospheric pressure (or under vacuum) and it is desirable to avoid distilling appreciable amounts of water during the condensation reaction. Although condensation may be accomplished at temperatures as low as about 30° C., it is desirable that the condensation reaction be conducted at a temperature of at least about 50° C. Ordinarily it is not advantageous to conduct the condensation at a temperature higher than about 100° C. The time required for the condensation reaction is an inverse function of the temperature at which the reaction is conducted. Condensation is complete after about five hours at approximately 95° C. In some instances a reaction time as long as about seven hours or as short as about three hours may be advantageous.

The ratio of phenol to aldehyde used is within the range ordinarily used for producing an oil-soluble resin from an alkyl- or aralkyl-substituted phenol by reaction with an aldehyde (i. e., the molar ratio of phenol to aldehyde is usually from about 0.5 to 1) although either higher or lower ratios may be used in certain instances. Most desirably the molar ratio is between about 0.65 and 0.8 based on the phenol used in the styrenation.

The following example illustrates the new process, but is not to be construed as limiting the scope of the invention.

Example

An oil-soluble phenolic resin is produced according to the following procedure:

Phenol (64.4 grams) and hydrogen chloride (1.7 grams of about a 36 per cent aqueous solution) are added to a three-neck flask equipped with a dropping funnel, a stirrer, and a Y tube fitted with a reflux condenser and a thermometer, and the resulting mixture is heated to 120° C. Styrene (104 grams) is added dropwise to the flask over a period of about three hours; the temperature of the material in the flask is maintained at about 120° C. during the addition of styrene and for about one hour thereafter. The material in the flask is then cooled to about 95° C. An aldehyde (81 grams of formalin that is about 37 per cent aqueous formaldehyde) and hydrogen chloride (6.0 grams of an aqueous solution that is about 36 per cent HCl) are added to the flask and the reaction mixture is maintained, with stirring, at about 95° C. for an additional five hours. The resulting mixture is cooled and neutralized with NaOH; the water present is removed by vacuum distillation. The resulting resin is a friable solid having a softening temperature of about 125° F. and a Gardner-Holt viscosity (when diluted with toluene to about 60 per cent solids) of F. This resin is soluble in drying oils such as linseed oil.

Having described the invention, I claim:

1. A method of producing an oil-soluble phenolic resin that comprises bringing to a temperature of about 120° C. a mixture of phenol and hydrochloric acid, and maintaining the resulting mixture at about said temperature for approximately three hours during which time styrene is added to said mixture so that the molar ratio of phenol to styrene is 0.7:1, cooling the reaction products to about 95° C., adding hydrochloric acid to said reaction products, and then adding formalin in the ratio of about one mol of formaldehyde per 0.7 mol of phenol initially reacted, and maintaining the resulting mixture at approximately 95° C. for about five hours.

2. A method of producing an oil-soluble phenolic resin which comprises (1) producing a crude aralkyl phenol by causing condensation of (a) 0.7 mol of a mononuclear monohydric phenol containing a total of not more than ten carbon atoms, any substituent being an alkyl radical in a meta position, with (b) 1.0 mol of a 2-aryl-1-alkene having from eight to twelve carbon atoms in which the aryl substituent is mononuclear, has from six to ten carbon atoms, and has not more than two substituents, each of which is an alkyl radical, in the presence of a strong mineral-acid catalyst of the group consisting of hydrochloric, hydrobromic and phosphoric, and (2) thereafter causing condensation of formaldehyde with the said crude product.

3. A method as claimed in claim 2, in which the 2-aryl-1-alkene is styrene.

4. In a method of producing an oil soluble phenolic resin that includes (1) producing an aralkyl phenol by causing condensation of (a) a mononuclear monohydric phenol containing a total not more than ten carbon atoms, any substituent being an alkyl radical in a meta position, with (b) a 2-aryl-1-alkene having from eight to twelve carbon atoms in which the aryl substituent is mononuclear, has from six to ten carbon atoms, and has not more than two substituents, each of which is an alkyl radical, in the presence of a strong mineral-acid catalyst of the group consisting of hydrochloric, hydrobromic and phosphoric, and (2) thereafter causing condensation of formaldehyde with the aralkyl phenol, the improvement which consists of using 0.7 mol of the phenol per mol of the 2-aryl-1-alkene to produce a crude aralkylation product and thereafter causing condensation of the aldehyde with the crude aralkylation product.

5. An oil-soluble phenolic resin produced by the process of claim 1.

ARTHUR S. TEOT.

REFERENCES CITED

The following references are of record in the file of this patent:

UNITED STATES PATENTS

| Number | Name | Date |
| --- | --- | --- |
| 2,247,402 | Perkins et al. | July 1, 1941 |

FOREIGN PATENTS

| Number | Country | Date |
| --- | --- | --- |
| 340,989 | Germany | Sept. 20, 1921 |
| 819,626 | France | July 12, 1937 |